United States Patent [19]
Lew

[11] Patent Number: 5,241,865
[45] Date of Patent: Sep. 7, 1993

[54] MASS FLOWMETER

[76] Inventor: Hyok S. Lew, 7890 Oak St., Arvada, Colo. 80005

[21] Appl. No.: 693,929

[22] Filed: Apr. 29, 1991

Related U.S. Application Data

[63] Continuation-in-part of Ser. No. 617,492, Nov. 21, 1990, abandoned.

[51] Int. Cl.$^5$ ................................................ G01F 1/84
[52] U.S. Cl. ................................................ 73/861.38
[58] Field of Search ........................ 73/861.37, 861.38

[56] References Cited

U.S. PATENT DOCUMENTS

| | | | |
|---|---|---|---|
| 4,127,028 | 11/1978 | Cox et al. | 73/861.38 |
| 4,660,421 | 4/1987 | Dahlin et al. | 73/861.38 |
| 4,756,197 | 7/1988 | Herzl | 73/861.38 |
| 4,811,606 | 3/1989 | Hasegawa et al. | 73/861.38 |
| 4,852,410 | 8/1989 | Corown et al. | 73/861.38 |
| 5,044,208 | 9/1991 | Corown et al. | 73/861.38 |

FOREIGN PATENT DOCUMENTS 0280013 11/1990 Japan ........................ 73/861.38

*Primary Examiner*—Herbert Goldstein

[57] ABSTRACT

A mass flowmeter comprises a pair of conduits with extremities restrained from lateral deflections disposed parallel to one another, each of which pair of conduits includes two end sections extending from the respective restrained extremities thereof and connected to one another by a curved or looped midsection, which two end sections are tied together by a clamp; wherein an electromagnetic vibrator exerting oscillating force for the two clamped combinations of the pair of end sections generates relative flexural vibration between the pair of conduits, and the mass flow rate of media moving through the pair of conduits is determined from the degree of asymmetry in the relative flexural vibration between the two opposite halves of the combination of the pair of conduits.

38 Claims, 3 Drawing Sheets

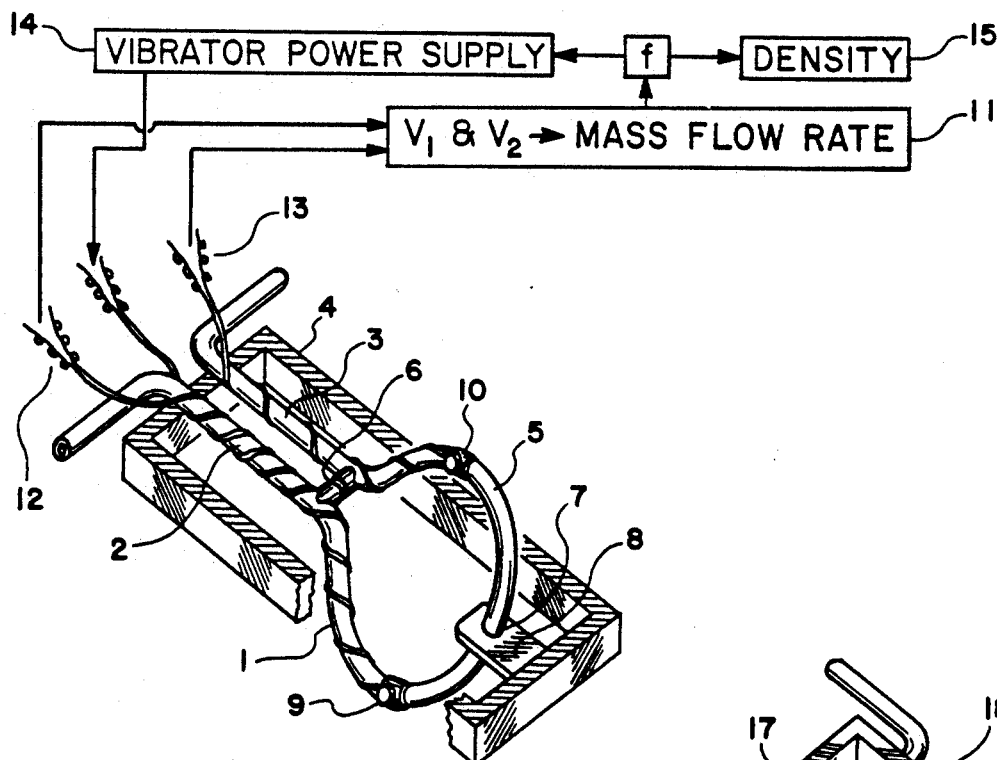
Fig. 1
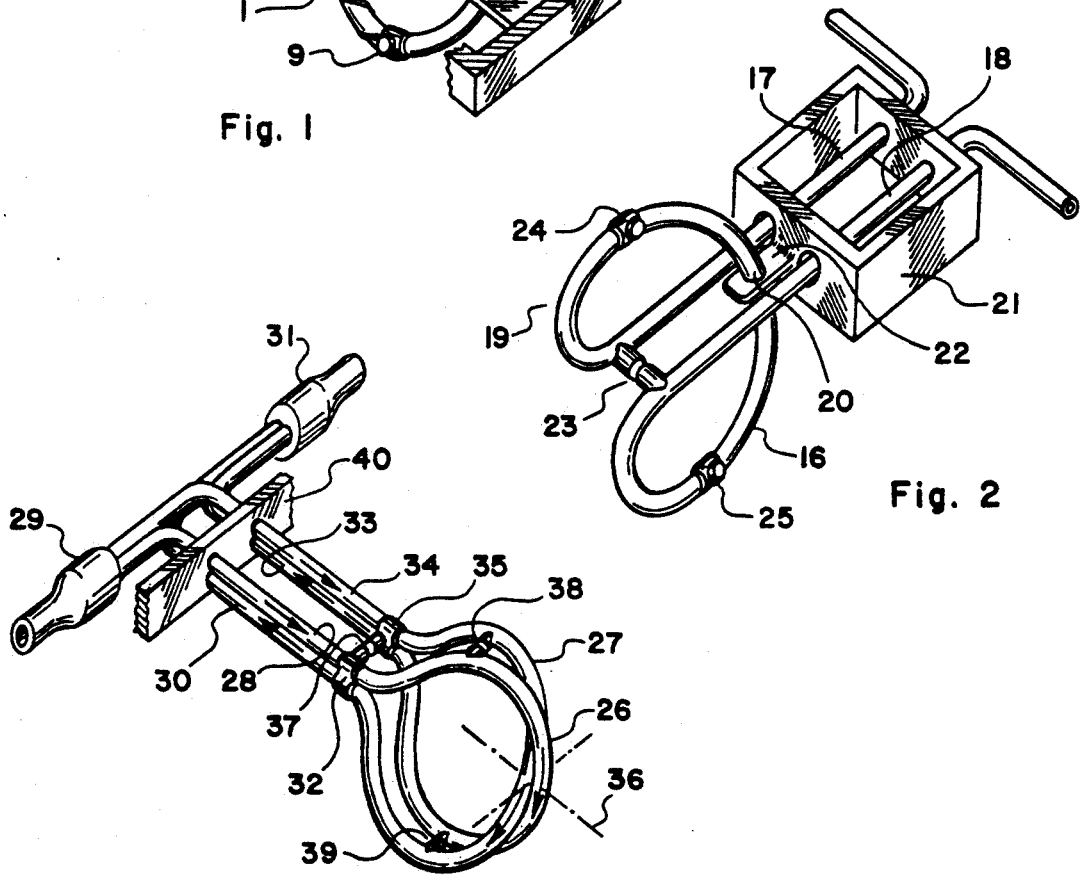
Fig. 2
Fig. 3

MASS FLOWMETER

This patent application is a continuation-in-part to a patent application Ser. No. 07/617,492 entitled "Convective Acceleration Flowmeter" filed on Nov. 21, 1990 now abandoned, and consequently, priority on the invention described and claimed in the present application is based on the aforementioned parent application.

BACKGROUND OF THE INVENTION

In the past ten years, a flowmeter measuring the mass flow rate of media employing a single or a pair of vibrating conduits, that is commonly known as the Coriolis force or convective inertia force flowmeter, has become quite popular and scored a spectacular success in the field of industrial flow measurements. The existing versions of this mass flowmeter comprising the vibrating conduits of U-shaped, S-shaped or looped conduits are unreasonably expensive, and their design as well as construction are not suitable for the construction of mass flowmeters of a size greater than a 2 inch port diameter. The present invention teaches mass flowmeters employing a single or a pair of vibrating conduits, which provides an alternative to the existing versions of the mass flowmeter in terms of reduced cost, improved sensitivity and/or better feasibility in design to construct mass flowmeters of larger sizes.

BRIEF SUMMARY OF THE INVENTION

The primary object of the present invention is to provide a mass flowmeter comprising a vibrating conduit including a first and second generally straight end sections disposed in a generally parallel and spaced apart arrangement and connected to one another by a curved midsection disposed substantially on a plane passing through the space between the first and second generally straight end sections, wherein an electromagnetic vibrator induces relative flexural vibration between the two opposite halves of the vibrating conduit, and the mass flow rate of media moving through the vibrating conduit is determined from the degree of asymmetry (deviation from symmetry or antisymmetry) in the flexural vibration between the two opposite halves of the vibrating conduit. In this embodiment, the midsection of the vibrating conduit coinciding with the midway in the curved midsection may be anchored to a rigid support anchoring the two extremities of the vibrating conduit.

Another object is to provide a mass flowmeter comprising a pair of the vibrating conduits defined in the primary object of the present invention, which pair of the vibrating conduits are disposed in a generally symmetric arrangement about a plane intermediate a first combination of the first end section of the first vibrating conduit connected to an inlet and the second end section of the second vibrating conduit connected to an outlet, and a second combination of the second end section of the first vibrating conduit connected to the outlet and the first end section of the second vibrating conduit connected to the inlet, wherein an electromagnetic vibrator induces relative flexural vibration between the first and second combinations of the end sections, and the mass flow rate of media moving through the pair of vibrating conduits is determined from the degree of asymmetry in the relative flexural vibrations between the two opposite halves of the combination of the two vibrating conduits. The midsections of the two vibrating conduits may be mechanically coupled to one another and/or anchored to a rigid support anchoring the two extremities of the combination of the two vibrating conduits.

A further object is to provide a mass flowmeter comprising a pair of vibrating conduits having common inlet and outlet legs disposed in a substantially parallel and spaced apart arrangement, wherein each of the two vibrating conduits includes two end sections secured to a rigid support at the first extremities and tied together at the second extremities and connected to one another by a planar curved midsection. An electromagnetic vibrator exerts a vibratory force to the second extremities of the pair of the two end sections tied together and respectively belonging to the two vibrating conduits, which vibratory force induces relative flexural vibration between the two vibrating conduits. The mass flow rate of the media moving through the two vibrating conduits is determined from the degree of asymmetry in the relative flexural vibration between the two opposite halves of the combination of the two vibrating conduits. The midsections of the two vibrating conduits may be mechanically coupled to one another and/or anchored to a rigid support anchoring the extremities of the two vibrating conduits. Of course, the electromagnetic vibrator may be relocated to the midsection of the combination of the two vibrating conduits.

Yet another object is to provide a mass flowmeter comprising a pair of vibrating conduits having common inlet and outlet legs disposed substantially parallel to one another, wherein each of the pair of vibrating conduits includes two end sections respectively extending from the two secured extremities of the vibrating conduit in a cantilever-like arrangement and connected to one another by a looped midsection, and over-hanging portions of the two end sections over-lap one another and are tied together at the over-lapping portions thereof. An electromagnetic vibrator exerts an alternating force to the sections of the two vibrating conduits including the end sections tied together, which alternating force induces relative flexural vibration between the two vibrating conduits. The mass flow rate moving through the two vibrating conduits is determined from the degree of asymmetry in the relative flexural vibration between the two opposite halves of the combination of the two vibrating conduits. The midsection of the two vibrating conduits may be coupled to one another and/or anchored to a rigid support anchoring the extremities of the two vibrating conduits.

Yet a further object is to provide a mass flowmeter comprising a pair of vibrating conduits having common inlet and outlet legs disposed substantially parallel to one another, wherein each of the pair of vibrating conduits includes two end sections respectively extending from the two secured extremities of the vibrating conduit in a cantiliver-like arrangement and connected to one another by a looped midsection, and a first end section of the first vibrating conduit connected to the inlet leg and a second end section of the second vibrating conduit connected to the outlet leg are disposed in a side by side arrangement intermediate a second leg of the first vibrating conduit and a first leg of the second vibrating conduit, and tied together by a clamp. An electromagnetic vibrator affixed to the clamped section of the combination of the first end section of the first vibrating conduit and the second end section of the second vibrating conduit induces relative flexural vibration between the two vibrating conduits. The mass flow rate is determined from the degree of asymmetry in the relative flexural vibration between two opposite halves of the combination of the two vibrating conduits. The midsection of the two vibrating conduits may be mechanically coupled to one another and/or secured to a rigid support anchoring the extremities of the two vibrating conduits.

These and other objects of the present invention will become clear as the description thereof progresses.

BRIEF DESCRIPTION OF THE FIGURES

The present invention may be described with a greater clarity and specificity by referring to the following figures:

FIG. 1 illustrates a perspective view of an embodiment of the mass flowmeter of the present invention.

FIG. 2 illustrates a perspective view of another embodiment of the mass flowmeter of the present invention.

FIG. 3 illustrates a perspective view of a modified version of the embodiment shown in FIG. 1.

OPERATING PRINCIPLES OF THE INVENTION

Figure 4:
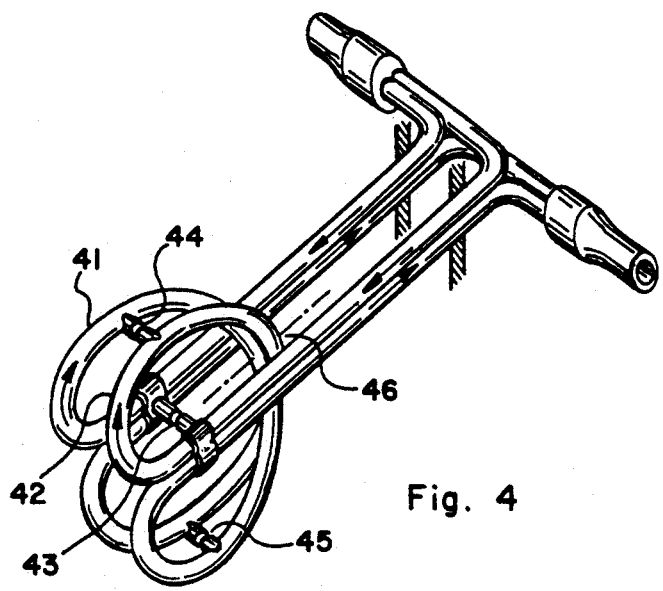
FIG. 4 illustrates a perspective view of a modified version of the embodiment shown in FIG. 2.

It is a well established fact and widely understood knowledge that, when a reasonably stiff conduit containing moving medium is laterally vibrated in a symmetric mode about the midsection of the conduit (primary flexural vibration of symmetric mode) by an electromagnetic vibrator exerting an alternating lateral force on the conduit, the convective inertia force or Coriolis force resulting from the reaction of the moving media through the conduit to the primary flexural vibration of symmetric mode generates a secondary flexural vibration of antisymmetric mode, wherein the primary and secondary flexural vibrations take place on the same plane. On the other hand, a primary flexural vibration of antisymmetric mode generates a secondary flexural vibration of symmetric mode. The mass flow rate of the media moving through the conduit is proportional to the ratio of the amplitude or magnitude of the secondary flexural vibration to the amplitude or magnitude of the primary flexural vibration (normalized amplitude or magnitude of the secondary flexural vibration). Therefore, the mass flow rate of the media can be determined from the degree of asymmetry (deviation from the symmetry or antisymmetry) of the resultant flexural vibration (sum of the primary and secondary flexural vibrations) of the conduit by using an empirically obtained mathematical relationship therebetween. In patent applications Ser. No. 07/643,420 filed on Jan. 22, 1991 and Ser. No. 07/648,121 filed on Jan. 30, 1991 describing methods for measuring mass flow rate, a detailed mathematical analysis on the relationship between the primary and secondary flexural vibrations of the conduit carrying moving media is presented and it is shown that the mass flow rate can be determined as a function of the phase angle difference $\Delta\phi$ in the flexural vibration between two different sections of the conduit, or as a function of the ratio of vibratory velocities between $(V_1 - V_2)$ and $(V_1 + V_2)$, where $V_1$ and $V_2$ are the amplitude of the vibratory velocities respectively measured at two different sections of the conduit, or as a function of the ratio of vibratory velocities between $V_1$ measured at the moment when $V_2$ vanishes and $V_1$ measured at the moment when $V_2$ reaches its peak value. The structural embodiment of the mass flowmeter of the present invention operates on the principles described by the preceding paragraphs.

THE DESCRIPTION OF THE ILLUSTRATED EMBODIMENTS

In FIG. 1 there is illustrated a perspective view of an embodiment of the mass flowmeter constructed in accordance with the principles of the present invention. The mass flowmeter comprises a vibrating conduit 1 including two generally straight end sections 2 and 3 respectively disposed on two planes facing one another and extending in a cantilever-like arrangement from first extremities thereof secured to a rigid support 4, which two end sections 2 and 3 are connected to one another by a substantially coplanar curved midsection 5 disposed substantially intermediate two planes respectively including the central axes of the two end sections 2 and 3 of the vibrating conduit, wherein the plane including the curved midsection 5 intersects the two planes respectively including the two end sections 2 and 3 in a small oblique angle. An electromagnetic vibrator 6 disposed at an over-hanging section of the combination of the two end sections 2 and 3 continuously exerts an alternating force or intermittently exerts an impulse, that induces a flexural vibration of the two end sections 2 and 3 relative to one another and generates relative flexural vibration of the two halves of the vibrating conduit, wherein the midsection 7 is the nodal section, which midsection may be left unsupported or may be supported by a plate 8 anchored to the rigid support 4. It is generally preferred that the supporting plate 8 is thin and disposed perpendicular to the supported midsection 7 of the conduit whereby a pivoting movement of the curved midsection 5 of the conduit 1 about an axis parallel to and intermediate the two end sections 2 and 3 is allowed, while lateral movement thereof is restrained. Two motion sensors 9 and 10 respectively disposed at two opposite halves of the curved midsection 5 measures velocities of the flexural vibrations thereat. The electrical signals generated by the two motion sensors 9 and 10, and respectively representing the flexural vibrations $V_1$ and $V_2$ of the two opposite halves of the curved midsection 5 of the conduit 1 are transmitted to a data processor 11 by lead wires 12 and 13, respectively. It is readily recognized that the electromagnetic vibrator 6 generates the primary flexural vibration of the conduit, that has an antisymmetric distribution about the midsection 7 of the conduit. The inertia force of the media moving through the conduit 1 created as a reaction to the antisymmetric primary flexural vibration of the conduit 1 generates a secondary flexural vibration that has a symmetric distribution about the midsection 7 of the conduit. The mass flow rate of media moving through the conduit 1 is proportional to the ratio of the amplitude or magnitude of the symmetric secondary flexural vibration to the amplitude or magnitude of the antisymmetric primary flexural vibration, which value is known as the normalized value of the secondary flexural vibration that is proportional to the phase angle difference $\Delta\phi$ between two flexural vibrations respectively measured by the two motion sensors 9 and 10, or to amplitude ratios $(V_1-V_2)/(V_1+V_2)$ where $V_1$ and $V_2$ are the flexural vibration respectively measured by the two motion detectors 9 and 10, or to the ratio of $V_1$, measured at the moment when $V_2$ vanishes, to $V_1$ measured at the moment when $V_2$ reaches its peak value, all of which combinations of parameters represent the normalized degree of asymmetry in the resultant flexural vibration of the conduit between the two opposite halves thereof. The data processor 11 determines the numerical value of mass flow rate of the media moving through the conduit 1 from the electrical signals respectively representing the flexural vibrations $V_1$ and $V_2$ and supplied by the two motion sensors 9 and 10 by using an empirically derived mathematical relationship stored therein, which data processor may also determine the natural frequency f of the primary antisymmetric flexural vibration of the conduit 1. The vibratory power supply 14 receiving the input information on the natural frequency f energizes the electromagnetic vibrator 6 with an alternating electrical current oscillating at a frequency equal to the natural frequency f, which arrangement ensures that the two opposite halves of the conduit 1 is vibrated at its natural frequency, that is necessary to ensure the accuracy of the mass flow measurement as well as to maximize the flexural vibration of the conduit. It is a well known fact that the natural frequency of the flexural vibration of a conduit is proportional to the square root of the combined mass of the conduit and the fluid contained in the conduit per unit length of the conduit divided by the stiffness parameter of the conduit. As a consequence, the density of the media moving through the conduit can be determined from the resonance frequency f by using an empirically derived mathematical relationship, which algorithm is executed by a data processor 15 that determines the media density from the resonance frequency f.

In FIG. 2 there is illustrated a perspective view of another embodiment of the mass flowmeter of the present invention, which embodiment is in essence a modified version of the mass flowmeter shown in FIG. 1. While the two end sections 2 and 3 of the conduit 1 employed in the mass flowmeter shown in FIG. 1 are connected to one another by a substantially coplanar curved midsection 5 extending therefrom in a direction away from the anchored extremities of the conduit, the substantially coplanar curved midsection 16 connecting the two generally straight end sections 17 and 18 of the conduit 19 extends from the two end sections 17 and 18 towards the anchored extremities of the conduit 19. The midsection 20 of the conduit 19 may be left unsecured or may be secured to a rigid support 21 by a plate or bracket 22. The electromagnetic vibrator 23 and the pair of motion sensors 24 and 25 play the same roles as those of the corresponding elements included in the embodiment shown in FIG. 1.

In FIG. 3 there is illustrated a perspective view of an embodiment of the mass flowmeter that is a modified version of the embodiment shown in FIG. 1. This version of the mass flowmeter includes a pair of conduits 26 and 27, each of which has essentially the same configuration as the conduit 1 shown and described in conjunction with FIG. 1. The conduits 26 and 27 are disposed in a symmetric arrangement about a plane intermediate the combination of a first generally straight end section 28 of the conduit 26 connected to an inlet leg 29 and a second end section 30 of the conduit 27 connected to an outlet leg 31, which two end sections 28 and 30 are tied together by a clamp 32, and the combination of a second leg 33 of the conduit 26 connected to the outlet leg 31 and a first leg 34 of the conduit 27 connected to the inlet leg 29, which two end sections are tied together by a clamp 35, wherein the plane of symmetry intersects the two conduits 26 and 27 at the midsection 36 of the combination thereof whereat the two conduits 26 and 27 cross each other. The electromagnetic vibrator 37 disposed at a section of the combination of the end sections of the conduit whereat the clamps 22 and 35 are disposed vibrates the two opposite halves of each of the two conduits relative to one another in an antisymmetric mode. The first motion sensor 38 measures relative flexural vibration between the first halves of the two conduits 27 and 26, while the second motion sensor 39 measures relative flexural vibration between the second halves of the two conduits 27 and 26. It should be noticed that the primary flexural vibrations measured by the two motion sensors 38 and 39 are now symmetric to one another, while the secondary flexural vibrations measured thereby are now antisymmetric to one another. The mass flow rate of media moving through the two conduits 27 and 26 is determined from the degree of asymmetry between the two flexural vibrations respectively measured by the pair of motion sensors 38 and 39. In this embodiment, the two conduits 26 and 27 must have essentially the same natural frequency of flexural vibration, and the media flow must be bifurcated equally into the two conduits 26 and 27. The midsections of the conduit 26 and 27 crossing one another may be left uncoupled and unsecured or may be coupled as shown in FIG. 5 and/or secured to the rigid support 40 anchoring the extremities of the conduits 26 and 27.

In FIG. 4 there is illustrated a perspective view of an embodiment of the mass flowmeter that is a modified version of the embodiment shown in FIG. 2. This version of the mass flowmeter comprises a pair of conduits 41 and 42, each of which has the same configuration as that of the conduit 19 shown and described in conjunction with FIG. 2. The pair of conduits 41 and 42 are disposed and assembled in the same arrangement as the pair of conduits 27 and 26 included in the mass flowmeter shown in FIG. 3. The electromagnetic vibrator 43 generates relative flexural vibration between the combination of the first halves of the two conduits 41 and 42, and the combination of the second halves of the two conduits 41 and 42, which are symmetric about the midsection of the combination of the two conduits 41 and 42. The two motion sensors 44 and 45 respectively measure relative flexural vibrations between the first halves of the two conduits 41 and 42 and between the second halves of the two conduits 41 and 42. The mass flow rate of media is determined from the degree of asymmetry between the two flexural vibrations respectively measured by the two motion sensors 44 and 45. The two conduits 41 and 42 may be left uncoupled and unsecured as shown in the particular illustrated embodiment or may be coupled to one another at the midsections 46 thereof crossing each other as shown in FIG. 5 and/or secured to the support anchoring the extremities of the two conduits 41 and 42.

Figure 5:
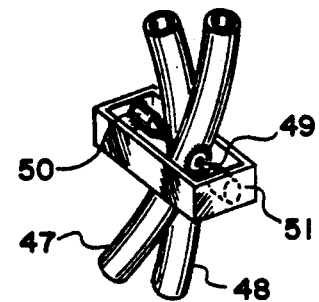
FIG. 5 illustrates an embodiment of the coupling that may be employed to couple the midsections of the vibrating conduits employed in the embodiment shown in FIG. 3 or 4 to one another.

In FIG. 5 there is illustrated an embodiment of coupling that mechanically couples two curved midsections 47 and 48 respectively belonging to the two conduits 27 and 26 included in the mass flowmeter shown in FIG. 3 or to the two conduits 41 and 42 included in the mass flowmeter shown in FIG. 4. The curved midsections 47 and 48 may be mechanically coupled to one another at the midsections thereof by a pair of coaxially disposed live centers 49 and 50 affixed to a bracket 51 and respectively supporting the curved midsections 47 and 48 in a pivoting relationship about an axis disposed on the plane of symmetry between the two opposite halves of the combination of the two vibrating conduits and passing through the midsection of the combination of the two vibrating conduits included in the embodiments shown in FIG. 3 or 4. Of course, the mechanical coupling including the two live centers 49 and 50 may be replaced by a simple plate with two side-by-side holes respectively retaining the two vibrating conduits extending therethrough. The bracket 51 or the simple plate mechanically coupling the midsections of the two vibrating conduits may be anchored to a rigid support anchoring the extremities of the two vibrating conduits.

It should be mentioned that the end sections of the vibrating conduit or conduits included in the mass flowmeters shown in FIGS. 1, 2, 3 and 4 may include bends disposed on a plane or planes parallel to the plane of symmetry between the two opposite halves of the vibrating conduits or between the two opposite halves of the combination of the two vibrating conduits. For example, the vibrating conduit or conduits included in the embodiments shown in FIGS. 1, 2, 3 and 4 may be modified to a configuration similar to that shown in FIG. 7 or 9 by incorporating appropriate bends into the end sections of the vibrating conduit.

Figure 6:
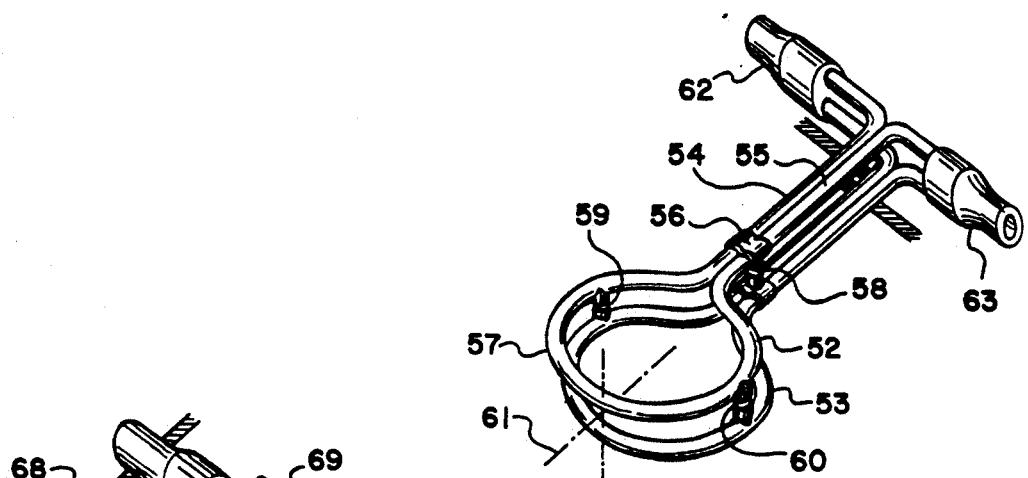
FIG. 6 illustrates a perspective view of a further embodiment of the mass flowmeter of the present invention.

In FIG. 6 there is illustrated a perspective view of a further embodiment of the mass flowmeter of the present invention, that is a straight forward revision of the concept constituting the foundation of the embodiment shown in FIG. 3. This version of mass flowmeter comprises a pair of vibrating conduits 52 and 53 respectively disposed on two generally parallel planes, wherein each of the pair of conduits comprises two generally straight end sections 54 and 55 respectively extending from the two secured extremities of the conduit in a side-by-side arrangement, which two generally straight end sections tied together by a clamp 56 are connected to one another by a substantially coplanar curved midsection 57. An electromagnetic vibrator 58 exerts alternating force to the over-hanging portions of the combinations of the generally straight end sections of the conduits 52 and 53, which alternating force induces relative flexural vibration between the two conduits 52 and 53 in directions perpendicular to those planes respectively including the two conduits 52 and 53. A first relative motion sensor 59 measures the relative flexural vibration between the first halves of the two conduits 52 and 53, while a second relative motion sensors 60 measures the relative flexural vibration between the second halves of the two conduits 52 and 53. The mass flow rate of media moving through the two conduits is determined from the degree of asymmetry in the relative flexural vibration between the two opposite halves of the combination of the curved midsections of the two conduits 52 and 53. The curved midsections of the two conduits 52 and 53 may be mechanically coupled to one another at the midway section 61 thereof by a plate with two holes respectively engaged by the two conduits 52 and 53 as shown in the embodiment illustrated in FIG. 7, wherein the plate coupling the curved midsections of the two conduits may be left unsecured or anchored to a rigid support anchoring the extremities of the two conduits 52 and 53. The two conduits 52 and 53 must have the same configuration and construction whereby they have the same natural frequency of flexural vibration generated by the electromagnetic vibrator 58. It is important that the inlet and outlet legs 62 and 63 bifurcate the media flow equally through the two conduits 52 and 53. It is readily recognized that the electromagnetic vibrator 58 can be relocated to the midsection 61 of the combination of the two conduits 52 and 53.

Figure 7:
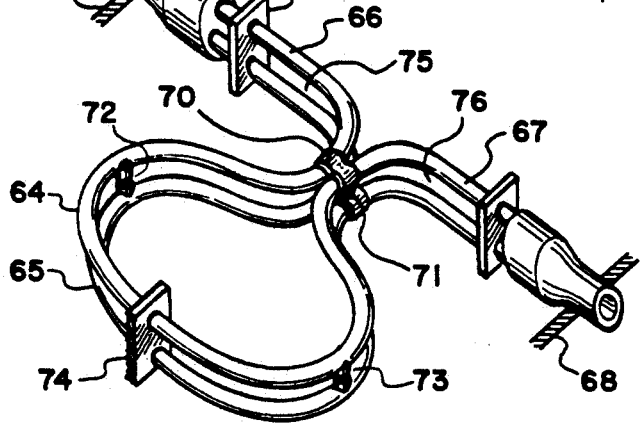
FIG. 7 illustrates a perspective view of yet another embodiment of the mass flowmeter of the present invention.

In FIG. 7 there is illustrated a perspective view of yet another embodiment of the mass flowmeter, that is a revised version of the embodiment shown in FIG. 6. The pair of conduits 64 and 65 have essentially the same configuration and are assembled into the same assembly as the two conduits 52 and 53 included in the embodiment shown in FIG. 6 with one exception, which exception is the two end sections 66 and 67 included in each of the two conduits 64 and 65. Each of these end sections 66 and 67 includes a ninety degree bend intermediate the first extremity thereof anchored to the rigid support 68 and tied together by the coupling plate 69 and the second extremity including the tying clamp 70 that anchors the electromagnetic vibrator 71. It is readily recognized that the embodiment shown in FIG. 7 results when the combination of the first end sections 54 and the combination of the second end sections 55 of the two conduits 52 and 53 shown in FIG. 6 are spread apart by bending them in the two opposite directions, which suggests that the two combinations of the end sections of the two conduits may be disposed in an oppositely angled arrangement intermediate the two extremes respectively shown in FIGS. 6 and 7. The first relative motion detector 72 measures relative flexural vibration between the first halves of the two conduits 64 and 65, while the second relative motion sensor 73 measures relative flexural vibration between the second halves of the two conduits 64 and 65. The mass flow rate of media is determined from the degree of asymmetry in the flexural vibrations between the two opposite halves of the combination of the two conduits 64 and 65. The curved midsections of the two conduits 64 and 65 may be left unsecured or may be mechanically coupled to one another by a coupling plate at the midway section 74, wherein the coupling plate 74 may be left unsecured or anchored to a rigid support anchoring the two extremities of the two conduits 64 and 65. It is readily recognized that the coupling plate 74 can be omitted and the electromagnetic vibrator 71 can be relocated to the midway section 74. It is also recognized that the two relative motion sensors 72 and 73 may be relocated to new positions 75 and 76 intermediate the anchored and clamped ends of the combination of the end sections of the conduits.

Figure 8:
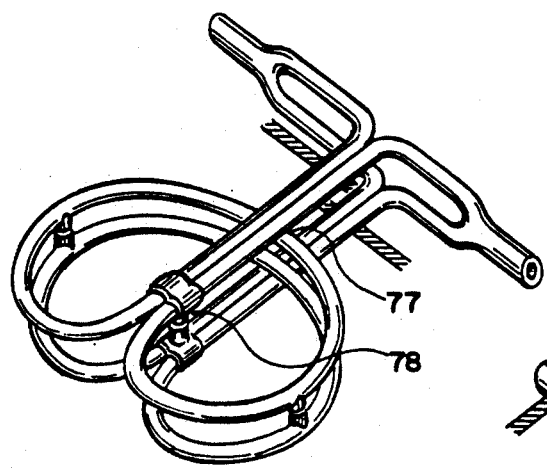
FIG. 8 illustrates a perspective view of a modified version of the embodiment shown in FIG. 6.

In FIG. 8 there is illustrated a perspective view of a revised version of the embodiment shown in FIG. 6, that results in when the substantially coplanar curved midsection 57 of each of the two conduits 52 and 53 shown in FIG. 6, which curved midsection connected to the two end sections 54 and 55 is extended towards the two anchored extremities of the conduit rather than away therefrom. The midsections of the two conduits may be mechanically coupled to one another at the midway section 77 as exemplified by the coupling plate 74 shown in FIG. 7. The electromagnetic vibrator 78 may be relocated to the midway section 77.

Figure 9:
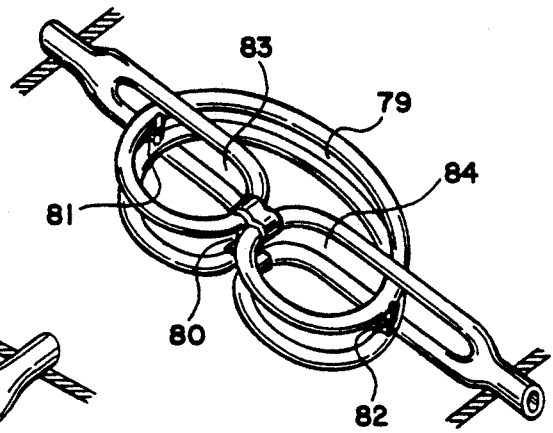
FIG. 9 illustrates a perspective view of a modified version of the embodiment shown in FIG. 7.

In FIG. 9 there is illustrated a perspective view of a revised version of the embodiment shown in FIG. 9, which version results when the curved midsection of each of the two conduits 64 and 65 shown in FIG. 7, is disposed on an opposite side of the over hanging position shown in FIG. 7. The two conduits may be coupled to one another by a coupling plate or bracket at the midway section 79 of the combination of the two conduits. The electromagnetic vibrator 80 may be relocated to the midway section 79. The two relative motion sensors 81 and 82 may be relocated to sections 83 and 84 of the combinations of the end sections, respectively.

Figure 10:
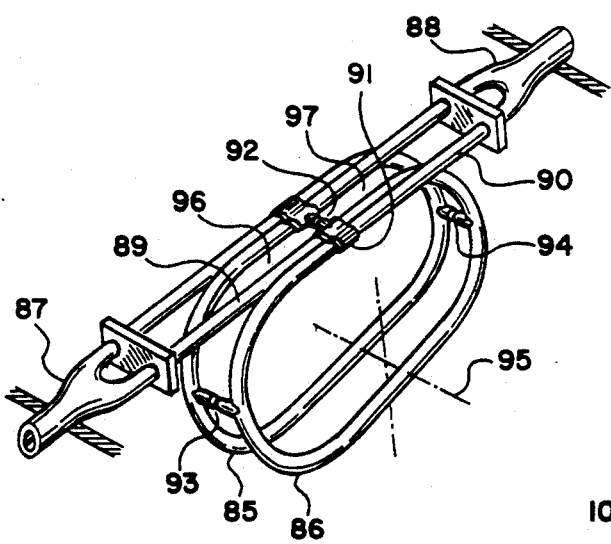
FIG. 10 illustrates a perspective view of yet a further embodiment of the mass flowmeter of the present invention.

In FIG. 10 there is illustrated a perspective view of yet a further embodiment of the mass flowmeter, that comprises a pair of conduits 85 and 86 disposed in a parallel and spaced apart arrangement, which two conduits are connected to common inlet and outlet legs 87 and 88 at the two extremities thereof, respectively. Each of the two conduits 85 and 86 includes two generally straight end sections 89 and 90 extending towards one another from the two secured extremities of the conduit, respectively, and overlaps one another in a side by side arrangement wherein a clamp 91 ties the two end sections together. A substantially coplanar looped midsection connects the two end sections 89 and 90 to one another. An electromagnetic vibrator 92 disposed at a section of the combination of the two conduits 85 and 86 whereat the tying clamps are located vibrates the two conduits 85 and 86 relative to one another in directions generally perpendicular to a plane substantially parallel to both of the looped midsections of the two conduits 85 and 86. A first relative motion sensor 93 measures relative flexural vibration between the first halves of the two conduits 85 and 86, while a second relative motion sensor 94 measures relative flexural vibration between the second halves of the two conduits 85 and 86. The mass flow rate of media moving through the two conduits is determined from the degree of asymmetry in the relative flexural vibration between the two opposite halves of the combination of the two conduits 85 and 86. The two conduits 85 and 86 may be mechanically coupled at the midway section 95 of the combination of the two conduits by a coupling plate as shown in the embodiment illustrated in FIG. 11. The two relative motion sensors 93 and 94 may be relocated to two sections 96 and 97 intermediate the clamped extremities and the anchored extremities of the end sections of the conduits. It is readily recognized that the end sections connected to the inlet leg 87 and the end sections connected to the outlet leg 88 can be disposed in an angled arrangement relative to one another and connected to one another by a looped midsection of loop angle less or greater than 360 degrees shown in the particular illustrated embodiment. The two conduits 85 and 86 must have the same natural frequency of the flexural vibration, which generally requires that the two conduits 85 and 86 must have the same configuration and construction. The inlet leg 87 and the outlet leg 88 must bifurcate the media flow equally through the two conduits 85 and 86. It is generally preferred that the electromagnetic vibrator 92 vibrates the two conduits 85 and 86 relative to one another at the natural frequency thereof.

Figure 11:
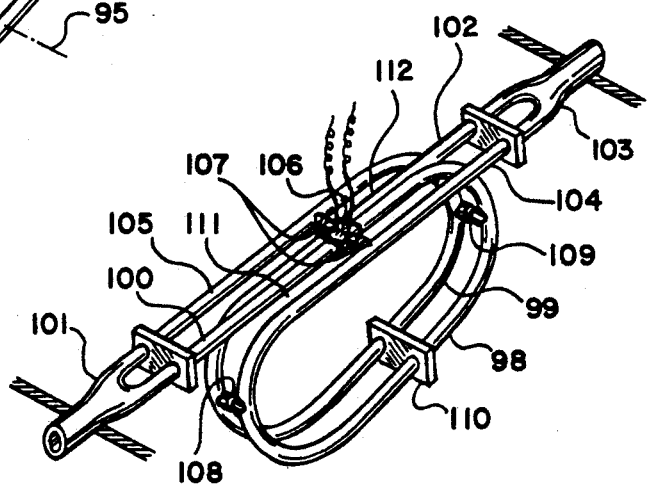
FIG. 11 illustrates a perspective view of a modified version of the embodiment shown in FIG. 10.

In FIG. 11 there is illustrated a perspective view of a revised version of the embodiment shown in FIG. 10. This version employs a pair of conduits 98 and 99 disposed parallel to one another each of which pair of conduits has essentially the same configuration as that of the conduits 85 and 86 shown and described in conjunction with FIG. 10. A first generally straight end section 100 of the first conduit 98 connected to an inlet leg 101 and a second generally straight end section 102 of the second conduit 98 connected to an outlet leg 103 are disposed side-by-side intermediate a second generally straight end section 104 of the first conduit 98 connected to the outlet leg 103 and a first generally straight end section 105 of the conduit 99 connected to the inlet leg 101, and tied together by a clamp 106. An electromagnetic vibrator 107 affixed to the tying clamp 106 and simultaneously pulling the two end sections 104 and 105 in an oscillating fashion induces a relative flexural vibration between a major portion of the conduit 98 adjacent to the outlet leg 103 and a major portion of the conduit 99 adjacent to the inlet leg 101. A relative motion detector 108 measures relative flexural vibration between the first halves of the two conduits 98 and 99, while a second relative motion detector 109 measures relative flexural vibration between the second halves of the two conduits 98 and 99. The mass flow rate of media is determined from the degree of asymmetry between the two opposite halves of the combination of the two conduits 98 and 99. The midsection of the two conduits 98 and 99 may be mechanically coupled to one another by a plate 110 at the midway section of the combination of the looped midsections of the two conduits 98 and 99. The two relative motion detectors 108 and 109 may be relocated to new position 111 intermediate the first and second end sections 100 and 104 of the conduit 98 and new position 112 intermediate the first and second end sections 105 and 102 of the conduit 99.

The illustrative embodiments of the absolute motion sensor usable in the construction of the mass flowmeters shown in FIGS. 1 and 2, and the embodiments of the relative motion sensors employable in the construction of the mass flowmeters shown in FIGS. 3, 4, 6, 7, 8, 9, 10 and 11 are shown in the parent patent application Ser. No. 07/617,492, which embodiments includes piezo electric type and magnetic induction coil type motion sensors. Other motion sensors of capacitive type or strain gauge type can be also employed in the construction of the mass flowmeter of the present invention.

While the principles of the present invention have now been made clear by the illustrative embodiments shown and described, there will be many modifications of the structures, arrangements, proportions, elements and materials, which are obvious to those skilled in the art and particularly adapted to the specific working environments and operating conditions in the practice of the invention without departing from those principles. It is not desired to limit the invention to the particular illustrative embodiments shown and described and accordingly, all suitable modifications and equivalents may be regarded as falling within the scope of the invention as defined by the claims which follow.

The embodiments of the invention, in which an exclusive property or priviledge is claimed, are defined as follows:

1. An apparatus for measuring mass flow rate of media comprising in combination:

a) a conduit with two extremities secured to a supporting structure including a first end section extending from one of the two secured extremities of the conduit, a second end section extending from the other of the two secured extremities of the conduit, and a curved midsection of a loop angle approximately equal to 360 degrees connecting the first and second end section to one another in a relationship wherein the central axes of the first and second end section of the conduit are disposed substantially parallel to a reference plane defined by the central axis of at least a central portion of the curved midsection of the conduit; wherein over-hanging extremities of the first and second end section of the conduit opposite to the secured extremities thereof and adjacent to the curved midsection of the conduit are disposed at a close proximity to one another and mechanically tied together;

b) means for exerting a force onto the conduit on a single line of action perpendicular to said reference plane and lying on a center plane intersecting a center section of the curved midsection of the conduit in a perpendicular relationship wherein said center plane divides the conduit into two equal opposite halves; wherein the force generates a flexural vibration of the conduit in directions perpendicular to said reference plane; and c) means for detecting difference in the flexural vibration between the two equal opposite halves of the conduit as a measure of mass flow rate of media moving through the conduit.

2. An apparatus as defined in claim 1 wherein said combination includes means for determining the mass flow rate as a function of the difference in the flexural vibration.

3. An apparatus as defined in claim 1 wherein said means for detecting difference in the flexural vibration comprises a first motion sensor measuring the flexural vibration at a first measuring section of the conduit, and a second motion sensor measuring the flexural vibration at a second measuring section of the conduit.

4. An apparatus as defined in claim 1 wherein said means for exerting a force is disposed at a section whereat the first and second end section of the conduit are mechanically tied together.

5. An apparatus as defined in claim 1 wherein the first and second end section of the conduit extend respectively from the two secured extremities of the conduit in a common direction, and the central portion of the curved midsection of the conduit is disposed beyond the over-hanging extremity of the combination of the first and second end section of the conduit.

6. An apparatus as defined in claim 1 wherein the first and second end section of the conduit extend respectively from the two secured extremities of the conduit in a common direction, and the central portion of the curved midsection of the conduit is disposed next to the combination of the first and second end section of the conduit at a section intermediate the secured extremity and the over-hanging extremity of the combination of the first and second end section of the conduit.

7. An apparatus as defined in claim 1 wherein the first and second end section of the conduit respectively have a J-shaped geometry and extend towards one another respectively from the two secured extremities of the conduit, and the curved midsection of the conduit is disposed on one side of a plane including the two secured extremities of the conduit and perpendicular to said reference plane.

8. An apparatus as defined in claim 1 wherein the first and second end section of the conduit respectively have a J-shaped geometry and extend towards one another respectively from the two secured extremities of the conduit, and the curved midsection of the conduit extends across a plane including the two secured extremities of the conduit and perpendicular to said reference plane.

9. An apparatus as defined in claim 1 wherein the central axes of the first and second end section of the conduit are respectively disposed on two opposite sides of a plane parallel to said reference plane, and over-lap one another over at least the over-hanging extremities of the first and second end section of said conduit mechanically tied together.

10. An apparatus as defined in claim 1 wherein said combination includes another conduit with two extremities secured to the supporting structure having a configuration substantially identical to the configuration of said a conduit, and disposed next to said a conduit in a substantially parallel and superimposing relationship with a space therebetween; wherein said means for exerting a force exerts the force onto said a and another conduit in two opposite directions and generates a relative flexural vibration between said a and another conduit in directions perpendicular to a plane disposed intermediate said reference planes of said a and another conduit, and said means for detecting difference in the flexural vibration detects difference in the relative flexural vibration between two opposite halves of the combination of said a and another conduit as a measure of mass flow rate of media moving through at least one of said a and another conduit.

11. An apparatus as defined in claim 10 wherein said combination includes means for determining the mass flow rate as a function of the difference in the relative flexural vibration.

12. An apparatus as defined in claim 10 wherein said means for detecting difference in the flexural vibration comprises a first relative motion sensor measuring the relative flexural vibration at a first measuring section of the combination of said a and another conduit, and a second relative motion sensor measuring the relative flexural vibration at a second measuring section of the combination of said a and another conduit.

13. An apparatus as defined in claim 10 wherein said means for exerting a force is disposed at a section whereat the first and second end section of said a conduit are mechanically tied together and the first and second end section of said another conduit are mechanically tied together.

14. An apparatus as defined in claim 13 wherein the center sections of the curved midsections of said a and another conduit are mechanically tied together.

15. An apparatus as defined in claim 13 wherein said means for detecting difference in the relative flexural vibration comprises a first relative motion sensor measuring the relative flexural vibration at a first measuring section of the combination of said a and another conduit, and a second relative motion sensor measuring the relative flexural vibration at a second measuring section of the combination of said a and another conduit.

16. An apparatus as defined in claim 13 wherein the first and second end section of each of said a and another conduit extend respectively from the secured extremities thereof in a common direction, and the central portion of the curved midsection of said each conduit is disposed beyond the over-hanging extremity of the combination of the first and second end section of the conduit.

17. An apparatus as defined in claim 13 wherein the first and second end section of each of said a and another conduit extend respectively from the secured extremities thereof in a common direction, and the central portion of the curved midsection of said each conduit is disposed next to the combination of the first and second end section of said each conduit at a section intermediate the secured extremity and the over-hanging extremity of the combination of the first and second end section of the conduit.

18. An apparatus as defined in claim 13 wherein the first and second end section of each of said a and another conduit respectively have a J-shaped geometry and extend towards one another respectively from the secured extremities thereof, and the curved midsection of said each conduit is disposed on one side of a plane including the secured extremities of said a and another conduit and perpendicular to said plane disposed intermediate the reference planes of said a and another conduit.

19. An apparatus as defined in claim 13 wherein the first and second end section of each of said a and another conduit respectively have a J-shaped geometry and extend towards one another respectively from the secured extremities thereof, and the curved midsection of said each conduit extends across a plane including the secured extremities of said a and another conduit and perpendicular to said plane disposed intermediate the reference planes of said a and another conduit.

20. An apparatus as defined in claim 13 wherein the central axes of the first and second end section of each of said a and another conduit are respectively disposed on two opposite sides of a plane parallel to the reference plane of said each conduit, and over-lap one another over at least sections of the first and second end section of said each conduit mechanically tied together.

21. An apparatus as defined in claim 10 wherein the first and second end section of each of said a and another conduit extend respectively from the secured extremities thereof in a common direction, and the central portion of the curved midsection of said each conduit is disposed beyond the over-hanging extremity of the combination of the first and second end section of the conduit.

22. An apparatus as defined in claim 10 wherein the first and second end section of each of said a and another conduit extend respectively from the secured extremities thereof in a common direction, and the central portion of the curved midsection of said each conduit is disposed next to the combination of the first and second end section of said each conduit at a section intermediate the secured extremity and the over-hanging extremity of the combination of the first and second end section of the conduit.

23. An apparatus as defined in claim 10 wherein the first and second end section of each of said a and another conduit respectively have a J-shaped geometry and extend towards one another respectively from the secured extremities thereof, and the curved midsection of said each conduit is disposed on one side of a plane including the secured extremities of said a and another conduit and perpendicular to said plane disposed intermediate the reference planes of said a and another conduit.

24. An apparatus as defined in claim 10 wherein the first and second end section of each of said a and another conduit respectively have a J-shaped geometry and extend towards one another respectively from the secured extremities thereof, and the curved midsection of said each conduit extends across a plane including the secured extremities of said a and another conduit and perpendicular to said plane disposed intermediate the reference planes of said a and another conduit.

25. An apparatus as defined in claim 10 wherein the central axes of the first and second end section of each of said a and another circuit are respectively disposed on two opposite sides of a plane parallel to the reference plane of said each conduit, and over-lap one another over at least sections of the first and second end section of said each conduit mechanically tied together.

26. An apparatus for measuring mass flow rate of media comprising in combination:
a) a conduit with two extremities secured to a supporting structure including a first and second end sections disposed at a close proximity to one another in a side-by-side parallel relationship and a curved midsection of a loop angle approximately equal to 360 degrees connecting the first and second end section to one another in a relationship wherein the central axes of the first and second end section of the conduit are disposed substantially parallel to a reference plane defined by the central axis of at least a central portion of the curved midsection of the conduit; wherein the two secured extremities of the conduit are secured to a common region of the supporting structure at one extremity of the combination of the first and second end section of the conduit and the combination of the first and second end section of the conduit extends from the secured extremity thereof in a common direction, and over-hanging extremities of the first and second end section of the conduit opposite to the secured extremities thereof and adjacent to the curved midsection of the conduit are disposed at a close proximity to one another and mechanically tied together;
b) means for exerting a force onto the conduit on a single line of action perpendicular to said reference plane and lying on a center plane intersecting a center section of the curved midsection of the conduit in a perpendicular relationship wherein said center plane divides the conduit into two equal opposite halves; wherein the force generates a flexural vibration of the conduit in directions perpendicular to said reference plane; and
c) means for detecting difference in the flexural vibration between the two equal opposite halves of the conduit as a measure of mass flow rate of media moving through the conduit.

27. An apparatus as defined in claim 26 wherein said combination includes means for determining the mass flow rate as a function of the difference in the flexural vibration.

28. An apparatus as defined in claim 26 wherein said means for detecting difference in the flexural vibration comprises a first motion sensor measuring the flexural vibration at a first measuring section of the conduit, and a second motion sensor measuring the flexural vibration at a second measuring section of the conduit.

29. An apparatus as defined in claim 26 wherein said means for exerting a force is disposed at a section whereat the first and second end section of the conduit are mechanically tied together.

30. An apparatus as defined in claim 26 wherein the central portion of the curved midsection of the conduit is disposed beyond the over-hanging extremity of the combination of the first and second end section of the conduit.

31. An apparatus as defined in claim 26 wherein the central portion of the curved midsection of the conduit is disposed next to the combination of the first and second end section of the conduit at a section intermediate the secured extremity and the over-hanging extremity of the combination of the first and second end section of the conduit.

32. An apparatus as defined in claim 26 wherein said combination includes another conduit with two extremities secured to a common region of the supporting structure having a configuration substantially identical to the configuration of said a conduit, and disposed next to said a conduit in a substantially parallel and superimposing relationship with a space therebetween; wherein said means for exerting a force exerts the force to said a and another conduit in two opposite directions and generates a relative flexural vibration between said a and another conduit in directions perpendicular to a plane disposed intermediate said reference planes of said a and another conduit, and said means for detecting difference in the flexural vibration detects difference in the relative flexural vibration between two opposite halves of the combination of said a and another conduit as a measure of mass flow rate of media moving through at least one of said a and another conduit.

33. An apparatus as defined in claim 32 wherein said combination includes means for determining the mass flow rate as a function of the difference in the relative flexural vibration.

34. An apparatus as defined in claim 32 wherein said means for detecting difference in the flexural vibration comprises a first relative motion sensor measuring the relative flexural vibration at a first measuring section of the combination of said a and another conduit, and a second relative motion sensor measuring the relative flexural vibration at a second measuring section of the combination of said a and another conduit.

35. An apparatus as defined in claim 32 wherein said means for exerting a force is disposed at a section whereat the first and second end section of said a conduit are mechanically tied together and the first and second end section of said another conduit are mechanically tied together.

36. An apparatus as defined in claim 35 wherein the center sections of the curved midsections of said a and another conduit are mechanically tied together.

37. An apparatus as defined in claim 32 wherein the central portion of the curved midsection of each of said a and another conduit is disposed beyond the over-hanging extremity of the combination of the first and second end section of the conduit.

38. An apparatus as defined in claim 32 wherein the central portion of the curved midsection of each of said a and another conduit is disposed next to the combination of the first and second end section of said each conduit at a section intermediate the secured extremity and the over-hanging extremity of the combination of the first and second end section of said each conduit.

* * * * *